Patented Dec. 22, 1936

2,065,190

UNITED STATES PATENT OFFICE 2,065,190

ALKALOIDAL COMPOUNDS

Frank Floyd Lindstaedt, Oakland, Calif., assignor to Hercules Glue Company, Ltd., San Francisco, Calif., a corporation of California No Drawing. Application March 26, 1931, Serial No. 525,611

8 Claims. (Cl. 260—25)

This invention relates to certain new reaction products secured by reacting an alkaloid, material with a gum, resin, or other material. In a copending case (Serial No. 371,302, filed June 15, 1929, now Patent No. 2,036,638 of April 7, 1936) of which this application is a continuation in part, I have shown utility of these materials, when made in certain proportions, as parasiticides. In this application I claim the reaction materials themselves and without reference to this use or the certain proportions developed in the previous application.

Broadly, I react an alkaloidal material including a pyridine ring as nicotine, coniine, dipiperidyl, and compounds and salts thereof, with a gum or resin. Volatile alkaloids are a clearly recognized class including nicotine and coniine—see my prior Patents No. 2,007,721 and No. 2,007,722 and Allen's Commercial Organic Analysis, volume 6, page 207.

As the preferred alkaloidal substance, I employ nicotine, either synthetic or that derived from tobacco, or any of its salts. As the salt, nicotine sulphate is preferred due to its commercial availability and lower cost. Commercial nicotine—that derived from tobacco—contains other alkaloidal substances such as nicoteine and nicotelline, which are also effective for the purposes described and react in a manner similar to that of nicotine.

As suitable gums and resins, termed by me "resinous materials", I have used kamala, tragacanth, agar-agar, Indian gum and shellac. These I react with the alkaloid by mixing the alkaloid and resinous material for about two hours so that they react. Usually the proportions are stoichiometric although, as I have disclosed in my prior Patent No. 2,036,638, an excess of the gum or resin is desirable when the product is to be fed to animals. The reaction mass is then dried, preferably at about 100° C., and to avoid breaking down the alkaloid and while continuing the mixing. Thereafter it can be screened. Although I am not certain, I am now of the opinion that the reaction is an esterification as water is apparently liberated when the materials are mixed.

I claim:

1. As a new compound the reaction product of kamala and a nicotine alkaloid.
2. The reaction product of nicotine and a member of the group consisting of kamala, tragacanth, Indian gum or shellac.
3. The process of reacting nicotine and kamala which comprises mixing nicotine and kamala together to permit them to react and then drying the mass.
4. As a new compound, kamala nicotinate.
5. As a new compound, kamala coniinate.
6. As a new compound, kamala dipiperdylate.
7. The reaction product of an alkaloid containing a pyridine ring and a resinous material.
8. The reaction product of an alkaloid containing a pyridine ring and a member of the group consisting of kamala, tragacanth, Indian gum, agar-agar, and shellac.

FRANK FLOYD LINDSTAEDT.